United States Patent [19]

Walker

[11] 4,016,565
[45] Apr. 5, 1977

[54] AIRCRAFT GROUND CLOSURE RATE FILTERING METHOD AND MEANS

[75] Inventor: Ferman L. Walker, Cedar Rapids, Iowa

[73] Assignee: Rockwell International Corporation, El Segundo, Calif.

[22] Filed: Sept. 15, 1975

[21] Appl. No.: 613,380

[52] U.S. Cl. .................... 343/7 TA; 235/150.22; 343/12 A
[51] Int. Cl.² .................... G01S 9/04; G06F 15/50
[58] Field of Search .................... 343/7 TA, 12 A; 235/150.22

[56] References Cited
UNITED STATES PATENTS

| | | | |
|---|---|---|---|
| 2,809,340 | 10/1957 | Bernhart | 343/7 TA |
| 2,930,035 | 3/1960 | Altekruse | 343/7 TA |
| 3,715,718 | 2/1973 | Astengo | 343/7 TA X |
| 3,946,358 | 3/1976 | Bateman | 235/150.22 X |
| 3,947,808 | 3/1976 | Bateman | 343/7 TA X |

*Primary Examiner*—Malcolm F. Hubler
*Attorney, Agent, or Firm*—Richard W. Anderson; Robert J. Crawford

[57] ABSTRACT

Ground closure rate between an aircraft and underlying terrain is obtained by differentially combining a radio altimeter derived rate signal and a barometric altitude rate signal to obtain a rate of change of ground profile signal. The ground profile rate is filtered on an autocorrelation basis to obtain a profile rate signal devoid of amplitude pulses introduced by sharp or discontinuous terrain features and recombined with barometric rate to obtain ground closure rate. The filtering technique imposes no rate limitation on the radio rate signal.

8 Claims, 6 Drawing Figures

AIRCRAFT GROUND CLOSURE RATE FILTERING METHOD AND MEANS

This invention relates generally to development of a signal indicative of closure rate between an aircraft and ground, and more particularly to a method and means for developing a ground closure rate signal from barometric and radio altimeter input signals which exhibits a minimum of lag while being relatively unresponsive to high rate perturbations caused by ground terrain profile irregularities.

Various avionics systems, such as flare landing control systems and ground proximity warning systems currently defined in the art, employ a ground closure rate signal which must be dependably indicative of the closure being experienced. Ground closure rate, as the name implies, requires a ground terrain referenced signal. While barometric altitude rate sources are accurate in the short term, they re notoriously lagging in the long term, and further are influenced by atmospheric disturbance introduced pressure changes. Most importantly, barometric sensors are sea level rather than ground profile referenced, and thus do not provide a measure of ground closure unless a further reference of terrain height above sea level is employed.

Radio altimeters, using various techniques, provide a measure of altitude which is definitive of ground clearance. Because of ground profile irregularities, this measure of altitude is extremely noisy in the short term, and development of altitude rate, as by differentiation of a radio altitude signal, produces an extremely noisy rate signal, since step-like functions of the altitude signal generate high amplitude spikes when differentiated.

Thus, known approaches to obtaining a closure rate signal include utilization of both barometric and radio altitude signals and systems are known which, for example, employed low-pass filtering of the radio altitude signal to clean up the ground profile irregularity introduced noise, and high-pass filtering of the barometric altitude signal to obtain reliable short-term rate components thereof, with subsequent summation of the filtered signals to arrive at an altitude rate signal, ground profile referenced, which is generally better than either source used in self.

The filtering technique, generally known in the art as complementary filtering, is widely known as a means for combining the best characteristics of signals from plural input sources to obtain an output signal which is better than any of the input signals, taken alone. This approach while entirely satisfactory in many systems, is often based on tradeoffs that preclude the generation of a satisfactory ground profile closure rate signal where ground irregularities may be such as to force design tradeoffs which render the signal less than optimum. The tradeoffs involved in obtaining ground closure rate from complementary filtering of barometric and radio altitude based rate signals, for example, may dictate long filter time constants to take out ground profile irregularity introduced noise, at the expense of obtaining a signal with a lag characteristic which precludes the signal from following general ground profile rises and falls as well as normal rates introduced by aircraft motion due to climbs and descents, and combinations of these. It has been found, for example, that the time constant of a low-pass filter used to directly filter a radio altimeter rate signal, within the limitation of a "livable" delay in response, may be far from that needed to clean high-rate-introduced spikes from the rate signal, while, conversely, the choice of a low-pass filter time constant sufficiently long to clean up these spikes, introduces a lag in the rate signal which prevents the signal from responding fast enough to follow rates introduced by normal aircraft vertical maneuvers or rates introduced by the average rise and fall of the ground terrain over which the aircraft passes. Thus, tradeoffs have been made, for example, by limiting the rate signal prior to filtering to render the signal nonresponsive to rates in excess of some predetermined value beyond which low-pass filtering would introduce an intolerable lag in the desired signal response. The lag introduced by the low-pass filter is compensated with a short-term characteristic "fill-in" of the system response, as developed independently from the rapid response of a barometric rate signal. In this tradeoff, where rate is limited, the derived rate signal, while it may be reasonably clean of high frequency noise, and may be acceptably responsive to rate changes for the intended usage, nonetheless imposes a rate limitation beyond which it may be desired to have the signal respond.

It may be appreciated that ground closure rate, as utilized in a system which compares the magnitude of this signal with a reference to provide a warning when the signal is deemed excessive, is affected by sharp ground profile irregularities and aircraft motions, as well as the general rise and fall of ground profile, and normal climb and descent rates which may be experienced. Any noise appearing on this signal then gives rise to false or nuisance warnings. At the same time, if the signal is filtered so extensively in removing the noisy perturbations that an appreciable lag is introduced, the resulting signal may not be sufficiently time responsive to follow significant and real rate changes in time to provide adequate warning.

Accordingly, the object of the present invention is the provision of a method and means for generating a ground closure rate signal having improved response characteristics and with more effective noise filtering than that possible by known means.

A further object of the present invention is the development of a closure rate indicative signal which imposes no limit on the rate signal.

Another object of the present invention is the provision for development of a ground closure rate signal by means permitting appreciable low-pass filtering of a radio altimeter derived closure rate signal without undue sacrifice of time response.

The present invention is featured in the provision of means for developing, from respective radio altimeter and barometric altimeter sources, a signal whose rate of change is dictated by rate of change of ground profile per se, with means for effecting low-pass filtering of the ground profile rate signal without a rate limit being imposed, and means for recombining the filtered ground profile rate signal and barometric altitude rate signal to obtain an improved ground closure rate signal.

A further feature is the provision of a novel time-correlation low-pass rate filtering means, including feedback means, whereby a rate indicative input signal is noise filtered in a more responsive manner and without imposition of a rate limit.

These and other features and objects of the present invention will become apparent after reading the following description, with reference to the accompanying drawings, in which:

Figure 1:
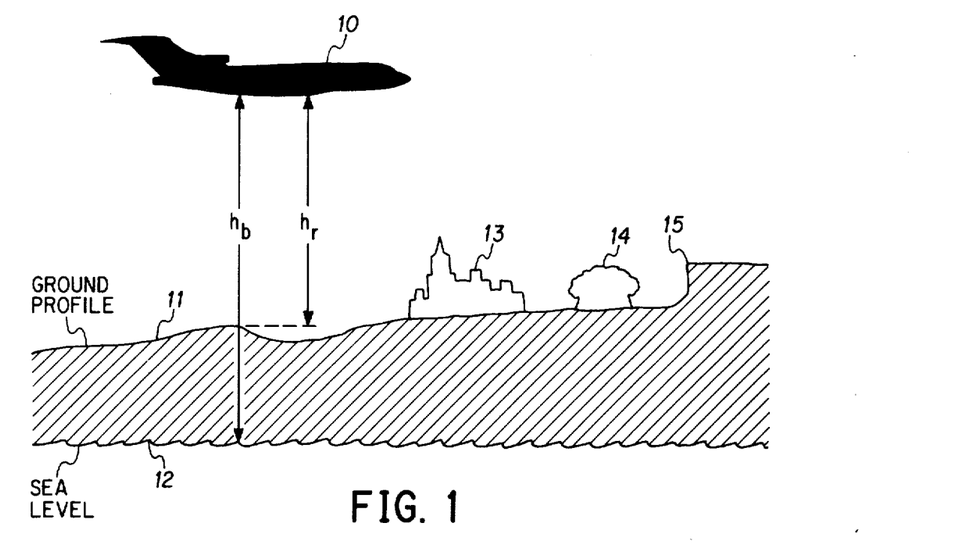
FIG. 1 is a diagrammatic representation of an aircraft flight situation illustrated depicting barometric and radio altimeter altitude references.

With reference to FIG. 1, aircraft 10 is depicted in flight over ground terrain having a ground profile 11. A barometric altimeter carried by aircraft 10 provides an altitude signal $h_b$ proportional to the barometric altitude of the craft, that is, the altitude of the craft with respect to sea level reference 12. A radio altimeter carried by aircraft 10 depicts at any instant the altitude of the craft above the ground profile 11 and thus provides an altitude signal proportional to radio altitude $h_r$. As above discussed, if it is desired to obtain a signal accurately indicative of the closure rate between the aircraft 10 and the ground, it is the radio altitude $h_r$ which is of interest, since its rate of change defines the closure rate with respect to the terrain. The rate of change of the barometric altitude signal $h_b$ is indicative of the rate of altitude change of the aircraft 10 with respect to sea level reference and is not influenced by the ground profile. It may further be noted that the rate of change of the radio altitude signal $h_r$ is collectively influenced by aircraft motion, the general rise and fall of ground terrain over which the aircraft 10 passes, and by ground profile irregularities such as the depicted building 13, trees 14, and sharp rise 15 in the ground profile. Thus, the rate of change of the radio altitude signal $h_r$, as might be obtained by the differentiation of the radio signal $h_r$, is extremely noisy. Were this radio rate signal, which is terrain referenced, utilized in a system to warn when the signal was in excess of a reference rate, the noise on the radio rate signal might well exceed the rate reference and thus cause a nuisance warning. It is to be understood, however, that a closure rate signal must, by definition be the rate of change of altitude between the craft 10 and the ground as defined by profile 11, and thus the radio altitude signal must in some way be utilized to obtain the desired signal.

As above discussed, the noise on the radio rate signal cannot be simply removed by low-pass filtering, since a low-pass filter, in having a sufficiently long time constant to remove the noise spikes, may introduce an undesirable lag in the system and the filtered radio rate signal would not timely respond to general rise and fall of the ground terrain profile. Further, the application of the noisy radio rate signal directly to a low-pass filter might overload the filter, and the recovery time, due to the long time constant, might be too long for the signal to truly follow the average (smooth) ground profile rise and fall. As above discussed, imposing a limit on the radio rate signal prior to low-pass filtering might enable the filter to remove the noise spikes at the expense of imposing an intolerably low rate limit for a given application. The use of complementary filter techniques to take care of the lag introduced by sufficient low-pass filtering of the rate signal still does not remove the rate limit imposed in these schemes, and the use of a known technique of complementing limited and low-passed radio rate with doubly-differentiated barometric rate, can tend to overload the filter, especially during a sustained period of descending flight over rising terrian when radio rate might well be in excess of the imposed limit. A closure rate signal, which necessarily is ground profile referenced, must be obtained from some measure of altitude between the aircraft and ground and thus, the radio altimeter signal which provides this ground clearance altitude signal obviously must be filtered in some manner to rid it of high noise perturbations generated by rate taking of this signal. It is further to be realized that the rate of change of a radio altimeter signal, in being inherently noisy due to ground profile irregularities, is, in addition, noise compounded by perturbations due to aircraft motion. No known means of providing a sufficiently time responsive closure rate signal from radio determined altitude is known in the art with the exception of approaches such as the aforereferenced complementary filtering technique and rate limiting techniques which introduce tradeoffs such that, at best, the derived radio rate signal is a compromise for its intended purpose.

The present invention, as it will become apparent, is based on separating the ground profile rate per se from the rate introduced by aircraft motion — these two rates collectively defining the rate of change of a radio altitude signal. The ground profile rate signal, which is not influenced by aircraft motion, is then uniquely filtered in a manner providing a comparatively fast response without imposing rate limit. The filtered ground profile rate signal (analogous to ground profile slope) is then added to the aircraft motion rate (as defined by barometrically determined rate) to obtain an improved ground closure rate signal, sufficiently time responsive and devoid of noise to effectively be utilized, for example, in a ground proximity warning system without introducing nuisance warnings and without imposing aircraft vertical motion limitations. The ground closure rate signal development means to be described will be seen to offer an improved response, without imposing rate limitation, during situations of aircraft level flight over level ground, aircraft descent over level ground, aircraft level flight over rising ground, and aircraft descent over both rising and falling ground terrain.

Figure 2:
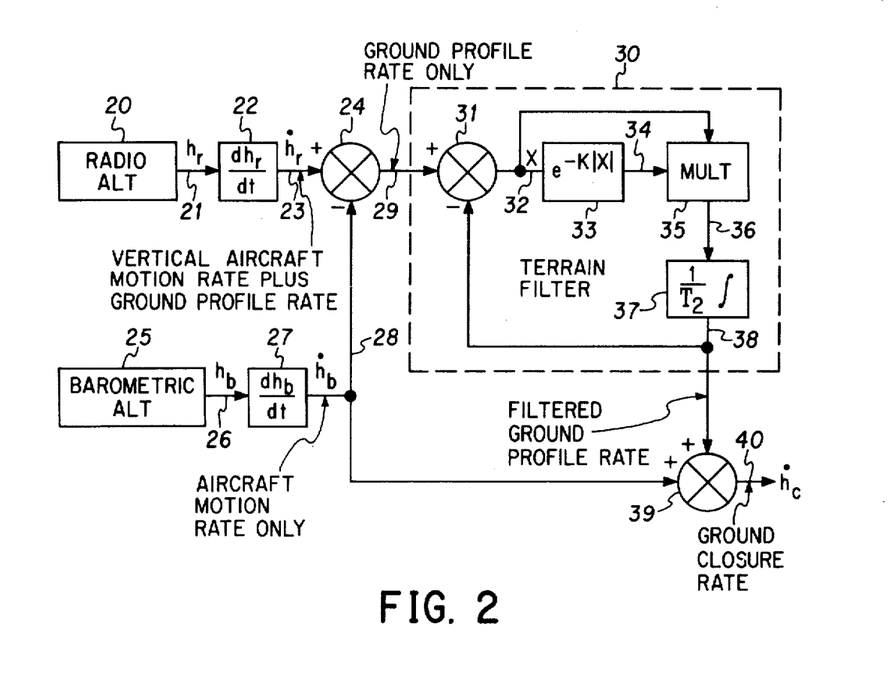
FIG. 2 is a functional block diagram of the improved closure rate signal development means.

A functional block diagram of the ground closure rate signal development means of the present invention is depicted in FIG. 2. Radio altimeter 20 provides an output signal 21 designated $h_r$ which is proportional to the clearance between the aircraft 10 and the ground profile 11. The radio altitude signal 21 is applied to a rate taking device 22, such as a differentiator, with the output 23 therefrom comprising a radio altitude rate signal designated $\dot{h}_r$ which is a rate signal due to the algebraic summation of aircraft motion with respect to the ground and the rate of change of the ground profile per se.

A second altitude signal is developed from barometric altimeter 25 the output 26 of which, designated $h_b$ is proportional to the height of the aircraft 10 above a sea level reference 12. The barometric altitude signal 26 is applied to a rate taking device, such as a differentiator 27, to develop an output 28, designated $\dot{h}_b$ which is a rate signal due only to aircraft motion and is in no way influenced by the ground profile.

The radio rate signal 23 and the barometric rate signal 28 are applied to a signal combining means 24 wherein the input signals 23 and 28 are subtractively combined such that the output 29 from combining circuit 24 is a rate signal due to the rate of change of ground profile only. Signal 29 is a ground profile rate signal since the radio input 23 to combiner 24 is a rate signal due to aircraft motion plus ground profile, while the barometric input rate 28 to combiner 24 is a rate signal due to aircraft motion only. Thus, by subtracting the rate signal due to aircraft motion from the rate signal due to this aircraft motion plus the ground profile introduced rate, the output signal 29 from combiner 24 which is a rate signal definitive of the rate of change of the ground profile per se.

In accordance with the present invention, it is this ground profile rate signal 29 which is filtered in a manner to responsively follow general rising and falling and sustained ground profile rate characteristics while removing therefrom high frequency noise components due to sharp irregularities in the ground profile. It is to be emphasized that this ground profile rate signal 29 is not influenced by rates attributed to aircraft motion, and thus is not influenced by vertical buffeting of the aircraft or by aircraft climb and descent motions.

The ground profile rate signal 29 is applied to a terrain filter network generally designated by reference numeral 30 from which a filtered ground profile rate signal 38 is obtained.

Terrain filter 30 operates without the imposition of a limit on the rate input thereto to responsively follow rises and falls in ground terrain while being unresponsive to noise perturbation due to sharp ground profile irregularities.

Referring to FIG. 2, the output 29 from signal combining means 24, which comprises the ground profile rate signal, is applied as a first input to a further signal combining means 31, the output 32 of which is applied to a signal translating means 33 having an exponential transfer function, designated $e^{-\kappa|x|}$. The output 34 from the signal translating means 33 is applied as a first input to a multiplier 35 which receives, as a second input thereto, the input 32 to the translating means 33. The output 36 from multiplier 35 is applied to an integrator 37 having a transfer function defined as $(1/T_2 S)$. The output 38 from the integrating network 37 comprises the filtered ground profile rate signal and is additionally fed back, in a subtractive sense, as a second input to signal comparator 31. As will be further described, the terrain filter 30 operates generally to smooth the input signal thereto by removing high frequency noise components, while, in the long term, forcing the output 38 to follow the input 29, due to the feedback loop.

The task of the terrain filter 30 is to obtain a smooth value that approximates the rate of rise or fall of the terrain over which the aircraft is flying. In developing a filter to perform this task, one must first determine the characteristics of the signal to be filtered.

When an aircraft is flying over smooth terrain, the rate of change of elevation will also be smooth and will be of relatively low values. However, sharp or discontinuous terrain features will give very large elevation rates. Stated another way, radio altitude signals emanating from adjacent terrain will be of approximately the same value if the terrain is smooth, but can differ significantly if the terrain from which the two signals come has an intervening discontinuity. In any event, a high correlation must exist among the amplitudes of terrain elevation rate obtained from adjacent points on smooth terrain, and a low correlation from adjacent points between which a terrain irregularity transition exists. A reasonable assumption is that the degree of correlation would be proportional to the rate of change of elevation. This suggests an exponential autocorrelation function may be used to describe the characteristics of the unfiltered terrain rate. If one, then, assumes that the elevation rates representing smooth terrain profiles are exponentially correlated, this criterion may be used to weigh the elevation rate inputs in formulating the filtered terrain rate. Operation of the filter depicted in FIG. 2 may be explained as follows. An input ground profile rate signal 29 is compared with the filtered ground profile rate signal 38. Any difference in these rates is represented by the output X of signal combiner 31 which is the value of the signal propagated through the filter. If the input rate signal 29 is approximately the same as the filtered output rate signal 38, the value of X is small and the value of the exponential is near unity, thus allowing most of the value of X to be applied to the integrator in deriving the filtered output 38. Any gradual change in the inputted ground profile rate signal 29 will therefore, be fully reflected in the integrator output. This enables the filtered output rate signal 38 to track all gradual changes in the input ground profile rate signal 29. Should the value of the inputted ground profile rate signal 29 suddenly change significantly, such as would be the case if the aircraft flew over an embankment or other sharp terrain feature, the value of X will be large and the output of the exponential would then be small so that the product of X and $e^{-\kappa|x|}$ would be small, resulting in very little change in the filtered output 38. Thus, it is seen that the terrain filter will track gradual changes in the input elevation rate 29, which are the characteristics of this signal which are wished to be extracted. However, large and sudden changes in the input ground profile rate signal 29, which would be caused by terrain irregularities which one does not want to track, have very little influence on the filtered ground profile rate output signal 38.

Since the output from the integrator 37 is combined via a negative feedback loop with the ground profile rate input 29 to the filter, the output 38 from the filter, in the long term, is forced to follow the input to the filter, with the result that no amplitude limitation on the rate input 29 to the filter is imposed.

Figure 3:
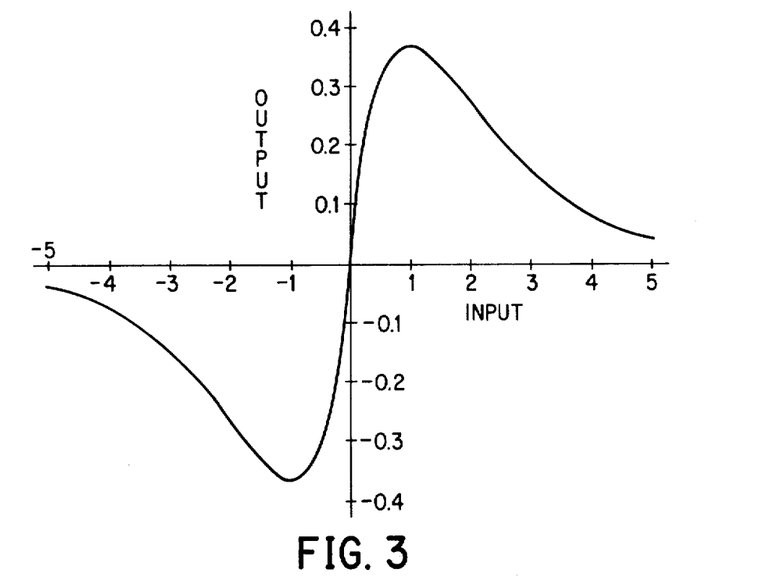
FIG. 3 depicts a mathematically ideal transfer function of a nonlinear element employed in terrain filter block of FIG. 2.

The elements 33 and 35 of the terrain filter provide a nonlinear transfer characteristic as ideally depicted in FIG. 3. The output 36 of multiplier 35 is linear for input rate signals of either sense up to a particular magnitude beyond which an attenuation characteristic is evidenced.

In accordance with the present invention, the filtered ground profile rate signal 38 from the terrain filter 30 is applied to a signal combining or summing network 39 along with the barometric rate signal 28. These signals are combined in an additive sense such that the output 40 of FIG. 2 constitutes a ground closure rate signal, designated $\dot{h}_c$. Stated another way, the filtered ground profile rate signal has added thereto the barometric altitude rate signal to again reconstitute or arrive at the ground closure rate signal. This feature of the filtering arrangement provides an added advantage, in that offset errors in barometric altitude rate do not degrade the calculation of closure rate $\dot{h}_c$, since this error passes through the terrain filter and is cancelled when the filter output 38 and $\dot{h}_b$ are summed.

The mathematically ideal transfer characteristic of elements 33 and 35 of the terrain filter 30 is depicted in FIG. 3. An actual implementation of the filter to be now described, is closely approximated by the characteristic of FIG. 4, wherein a pronounced break in the curve is evidenced at predetermined amplitudes of input rather than the mathematically continuous slope transition depicted by the ideal characteristic of FIG. 3.

Figure 4:
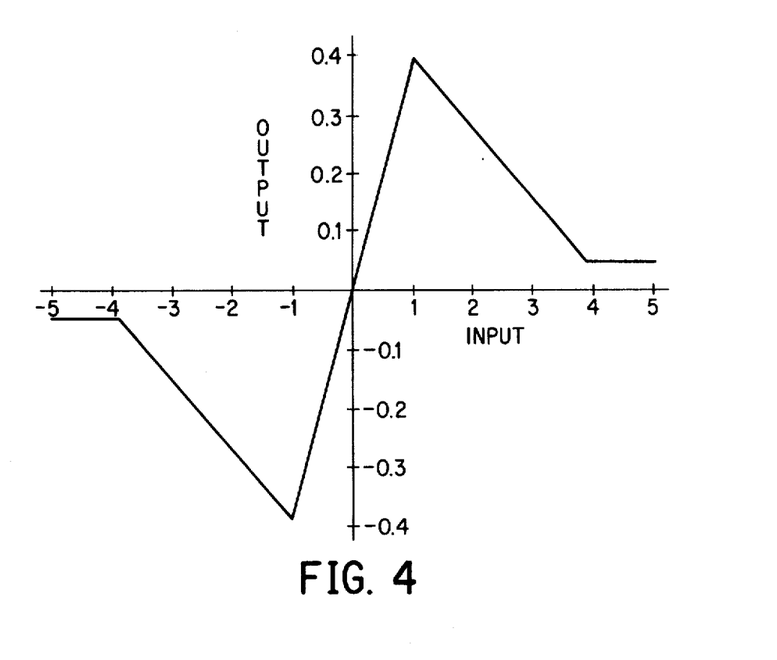
FIG. 4 depicts an approximated equivalent of the function of FIG. 3.
Figure 5:
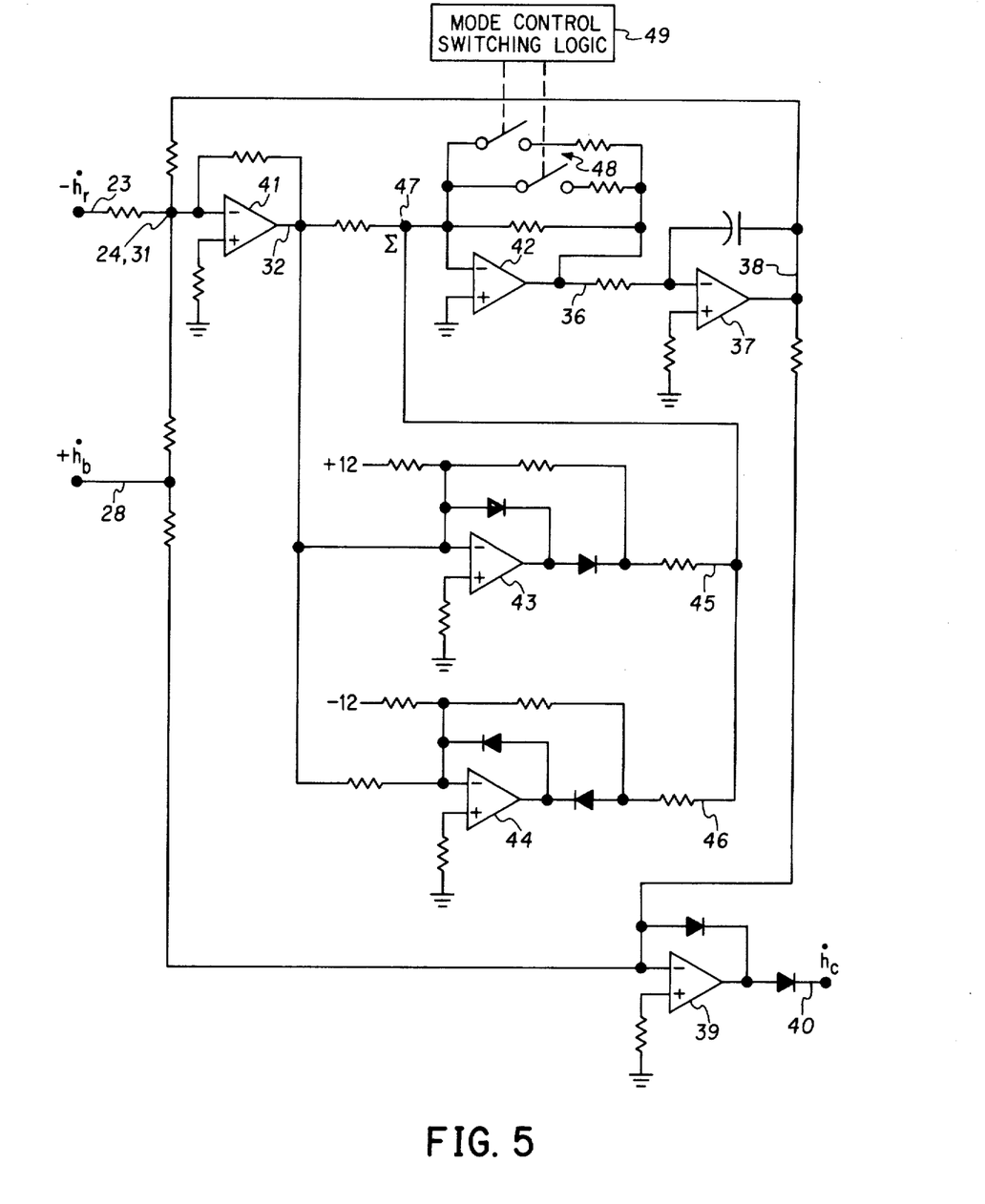
FIG. 5 is a schematic diagram of a terrain filter implementation including the nonlinear element providing the characteristics of FIG. 4.

FIG. 5 is a schematic diagram of an implementation by means of which ground closure rate may be developed from radio rate and barometric rate inputs, wherein the terrain filter portion of the circuitry includes a nonlinear element by means of which the approximation characteristic of FIG. 4 may be realized. Referring again to FIG. 4, the characteristic of the nonlinear element, comprised of exponential block 33 and multiplier 35 of FIG. 2, is seen to provide a linear output for input signals up to a predetermined amplitude. As input signals exceed this predetermined amplitude, the output characteristic exhibits a negative slope down to a fixed output level. The characteristic of FIG. 4 is chosen as contiguous straight line segments which collectively approximate the mathematically ideal characteristic of FIG. 3.

The implementation of FIG. 5 utilizes operational amplifiers which collectively exhibit appropriate bias offset characteristics and saturation characteristics such that the combined outputs thereof provide the desired characteristic depicted in FIG. 4. FIG. 5 illustrates radio rate input 23 and barometric rate input 28 to a circuitry comprising six operational amplifiers from which the ground closure rate output 40 is obtainable. The radio rate and barometric rate inputs 23 and 28 are depicted in FIG. 5 as having opposite senses, it being understood that this infers a preceding inversion of the sense of one of these inputs. As utilized in FIG. 5, the radio rate input 23 is assumed to be of negative sense while the barometric input 28 is assumed to be of positive sense. Thus, inputs 23 and 28, as applied to the inverting input of operational amplifier 41, imply that these signals are applied in a mutually subtractive sense. The output 32 from operational amplifier 41 is applied to the inverting input of a further operational amplifier 42 the output 36 of which is applied to the inverting input of a further operational amplifier 37 embodied as an integrator. The output 38 from integrator 37 is applied back to the noninverting input of the input operational amplifier 41, and since three successive phase inversions are present in the signal path, the output 38 from integrator 37 is applied in a subtractive sense as concerns the radio rate input 23 applied to this same input terminal. Thus, the terminal 24, 31 on the inverting input of operational amplifier 41, performs the function of signal combining means 24 and 31 depicted functionally in FIG. 2, since, at this point, both the output 38 of integrator 37 and the barometric rate input 28 are subtractively combined with the input radio rate signal 23.

The output 32 from input operational amplifier 41 is additionally applied to the inverting input terminals of a pair of further operational amplifiers 43 and 44. Outputs 45 and 46 from these further operational amplifiers are applied in common, and in an additive sense, with the output 32 from input operational amplifier 41 at junction 47. Thus, the combined outputs from operational amplifiers 41, 43 and 44 are applied to the inverting input of operational amplifier 42 which supplies input 36 to integrator 37.

The output 38 from integrator 37 is combined additively with the barometric rate input 28 and applied to the inverting input of output operational amplifier 39 the output 40 of which comprises the ground closure rate signal, $\dot{h}_c$.

It is noted that operational amplifiers 43 and 44, as employed in their respective circuitries, include oppositely sensed DC bias sources and polarized diodes such that neither of these operational amplifiers provides an output until the input to the inverting input terminals thereof exceeds a predetermined magnitude. Operational amplifier 43 will not conduct until the input thereto, and thus the output 32 from input operational amplifier 41, reaches a predetermined negative value sufficient to forward bias the diodes associated with operational amplifier 43. Similarly, operational amplifier 44 will not conduct until the input thereto, and thus the output 32 from input operational amplifier 41, reaches a predetermined positive value sufficient to forward bias the diodes associated with operational amplifier 44. Thus, for outputs 32 from input operational amplifier 41, (corresponding to the difference X between the output from integrator 38 and the ground profile rate signal) less than the predetermined thresholds of operational amplifiers 43 and 44, the input signal to integrator 37 comprises a linear amplification with predetermined gain of the signal 32, to provide the linear characteristic on either side of zero input depicted in the desired transfer characteristic of FIG. 4. When the output 32 from input operational amplifier 41 exceeds the thresholds established for operational amplifiers 43 and 44, one or the other of these operational amplifiers, depending upon the polarity of the output 32 from input operational amplifier 41, conducts. These conduction points define the breaks in the operational characteristic of FIG. 4. If the gain of operational amplifiers 43 and 44 is appropriately chosen to exceed that of input operational amplifier 32, the combined output of operational amplifier 41 and the conducting one of operational amplifiers 43 and 44 results in a negative slope output characteristic which may be made to correspond to that depicted in the characteristic of FIG. 4. This negative slope portion continues with increasing input signal value until input operational amplifier 41 saturates, at which point the knee depicted in the operational characteristic of FIG. 4 is defined, since the input to the then conducting one of operational amplifiers 43 and 44 is constant and the output therefrom is correspondingly constant. Thus for input signals 32 to the nonlinear element circuitry which are in excess of that sufficient to saturate input operational amplifier 41, the output remains constant. This constant level is defined by the difference between the output 32 of input operational amplifier 41 and the conducting one of operational amplifiers 43 and 44 as summed at tie-point 47, it being realized that the outputs 45 and 46 from operational amplifiers 43 and 44 are phase inverted.

Figure 6:
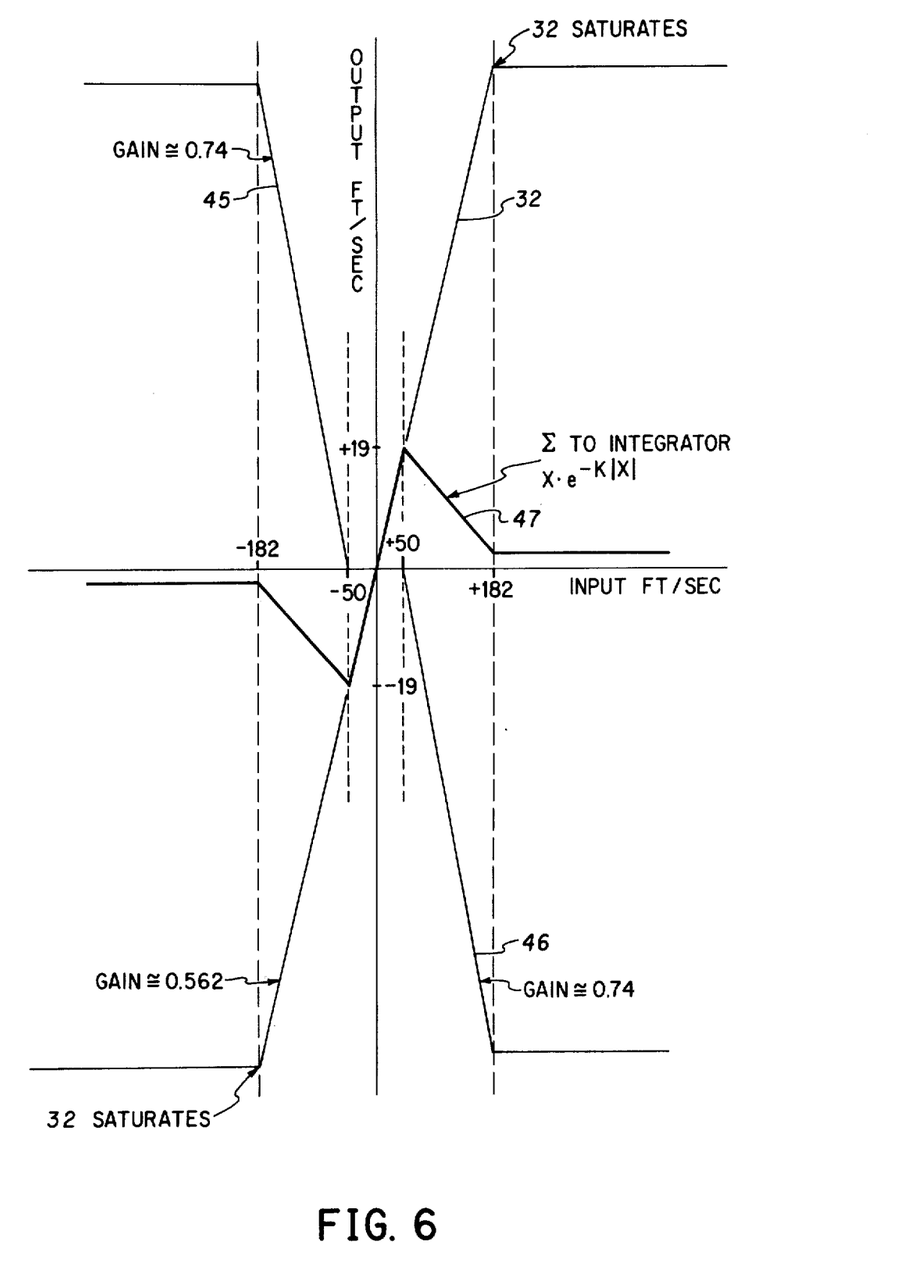
FIg. 6 is a graphic representation of the development of the characteristic of FIG. 4 by the circuitry of FIG. 5.

FIG. 6 illustrates graphically the development of the desired signal characteristic as applied to the integrator 37. The waveforms of FIG. 6 are referenced in terms of input and output signals representing rates in feet per second. The desired characteristic of the signal applied to integrator 37 is indicated in heavy line with linear application of input signals of either polarity for input signals 32 up to 50 feet per second. The 50 feet per second input signals provide outputs of 19 feet per second. The integrator input 36 then exhibits a negative slope from the break occurring at 50 feet per second input until the input reaches 182 feet per second, at which time the output levels off. FIG. 6 illustrates that the output 32 from input operational amplifier 41 rises linearly until it saturates at values of 182 feet per second. The offset as concerns operational amplifiers 43 and 44 is depicted by respective outputs 45 and 46 from these operational amplifiers being zero until the output 32 from input operational amplifier 41 rises to the 50 foot per second threshold at which one or the other of operational amplifiers 43 and 44 conducts. Operational amplifier 43 provides an output 45 which rises linearly for input signals thereto in excess of minus 50 feet per second. This linear output 45 continues until the output 32 from operational amplifier 41 saturates, at which time the output 45 from operational amplifier 43 levels off. Similarly, operational amplifier 44 provides an output 46 when the input signal thereto (output 32 from input operational amplifier 41) rises to plus 50 feet per second at which time operational amplifier 44 conducts to provide a linear output until the output 32 from operational amplifier 41 saturates, at which time the output 46 levels off.

FIG. 6 illustrates that the relative gain as concerns the output 32 from operational amplifier 41 and the outputs 45 and 46 from operational amplifiers 43 and 44 are such that the combined output 32 of operational amplifier 41 and the conducting one of operational amplifiers 43 and 44 results in the desired negative slope portions of the resultant signal as applied to integrator 37. For example, FIG. 6 depicts that the slope of the output 32 from input operational amplifier 41 may be 0.562 while the slope of the respective outputs 45 and 46 from operational amplifiers 43 and 44 might be selected to be 0.74. Since a phase inversion occurs in operational amplifiers 43 and 44, the addition of the outputs 45 and 46 therefrom with output 32 from operational amplifier 41 results in the desired negative slope portion of the characteristic. FIG. 6 further depicts that as the input operational amplifier 41 saturates at the 182 feet per second level, the conducting one of operational amplifiers 43 and 44 levels off and the summation of the saturation level of 32 with the corresponding output from the conducting one of operational amplifiers 43 and 44 results in the leveling off of the characteristic as applied to the integrator.

Referring again to FIG. 5, operational amplifier 42 includes a selective gain feature comprised of feedback resistors which may be selectively switched in by switching means 48 under control of a mode control switching logic block 49. This feature is included since it may be desirable under various flight modes to change the gain of the terrain filter as a function of aircraft altitude, since ground irregularities will produce proportionally greater radio rates as the altitude of the aircraft decreases.

Implementation of FIG. 5 is thus seen to accept radio rate and barometric rate input signals and, in accordance with the present invention, process these signals in such a manner that the ground profile rate is filtered in an autocorrelated manner and then recombined with barometric rate to arrive at a ground closure rate output signal effectively filtered so as to minimize nuisance warnings as might be caused by ground profile irregularities.

Although the present invention has been described with respect to a particular embodiment thereof, it is not to be so limited as changes might be made therein which fall within the scope of the invention as defined in the appended claims.

What is claimed is:

1. Signal development means for deriving an output signal definitive of the elevation rate of change between an aircraft and underlying ground terrain comprising:
   first means for developing a first signal definitive of the absolute closure rate between aircraft and underlying ground terrain,
   second means for developing a second signal definitive of barometrically determined aircraft rate of change of altitude,
   means for subtractively combining said first and second signals to develop a third signal definitive of the rate of change of terrain profile,
   filtering means; said filtering means comprising a signal integrating means, signal correlation responsive means comprising a further signal combining means receiving said third signal and the output of said signal integrating means as respective inputs thereto and responsive to an exponential correlation therebetween to provide a correlation defined output signal, said correlation defined output signal being applied as input to said signal integrating means;
   the output of said signal integrating means comprising the output of said filtering means; still further signal combining means additively combining said second signal and said output of said filtering means; and
   the output of said still further signal combining means comprising said output signal.

2. Signal development means as defined in claim 1, wherein said first signal is definitive of the time derivative of the altitude proportional output from a radio altimeter, and said second signal is definitive of the time derivative of the altitude proportional output from a barometric altimeter.

3. Signal development means as defined in claim 1 wherein said signal correlation responsive means comprises a signal translating means having a transfer function substantially defined by $e^{-K|X|}$, where $e$ is the natural logarithm base, K is a constant and X comprises the output from said further signal combining means as applied to said signal translating means, signal multiplying means receiving the output of said further signal combining means and the output of said signal translating means as respective inputs thereto, with the output of said signal multiplying means comprising the input to said signal integrating means.

4. Signal development means as defined in claim 3, wherein the transfer function of said signal integrating means is approximated as $(1 T_2 S)$, where $T_2$ is a predetermined time constant and S is the La Placian operator.

5. Signal development means as defined in claim 3, wherein said signal translating means and said multiplying means, the collective transfer function of which is defined as $Xe^{-K|X|}$, are collectively implemented by a nonlinear element having a transfer function defined by contiguous linear transfer characteristic segments which collectively approximate the transfer function of $Xe^{-K|X|}$, with the output of said nonlinear element comprising the input to said signal integrating means.

6. Signal development means as defined in claim 5 wherein said nonlinear element comprises first saturable operational amplifier means providing a linear output at predetermined gain to said signal integrator; means combining said first and second signals and the output of said integrator, as applied to the input of said first operational amplifier means, whereby the output from said first operational amplifier means comprises said signal X; the output of said first operational amplifier means being applied as input to each of second and third operational amplifiers having gains in excess of the gain of said first operational amplifier and respectively biased to produce linear outputs when the input thereto exceeds respective opposite polarity signal magnitudes; means for combining the outputs of each of said first, second and third operational amplifiers; and means applying said last defined signal combination as input to said signal integrating means.

7. Signal development means as defined in claim 6 wherein said first operational amplifier provides a saturated output at a level in excess of the signal level at which said second and third operational amplifiers are rendered conductive and exceeding that of the outputs of said second and third operational amplifiers in response to that signal level.

8. Signal development means as defined in claim 7 comprising signal gain changing means receiving the summation of the outputs from said first, second and third operational amplifiers, with the output of said gain changing means being applied as input to said signal integrating means.

* * * * *